(12) United States Patent
Tran et al.

(10) Patent No.: US 12,579,053 B2
(45) Date of Patent: Mar. 17, 2026

(54) CONTEXTUAL TEST CODE GENERATION

(71) Applicant: Snap Inc., Santa Monica, CA (US)

(72) Inventors: Adrian Tran, Issaquah, WA (US); Sichao Wang, Irvine, CA (US)

(73) Assignee: SNAP INC., Santa Monica, CA (US)

( * ) Notice: Subject to any disclaimer, the term of this patent is extended or adjusted under 35 U.S.C. 154(b) by 76 days.

(21) Appl. No.: 17/820,691

(22) Filed: Aug. 18, 2022

(65) Prior Publication Data

US 2024/0061766 A1     Feb. 22, 2024

(51) Int. Cl.
G06F 11/3668 (2025.01)

(52) U.S. Cl.
CPC ...... G06F 11/3688 (2013.01); G06F 11/3684 (2013.01)

(58) Field of Classification Search
CPC .................................................... G06F 11/3684
See application file for complete search history.

(56) References Cited

U.S. PATENT DOCUMENTS

| | | | | |
|---|---|---|---|---|
| 5,671,415 | A * | 9/1997 | Hossain | .................... G06F 8/20 717/121 |
| 6,954,894 | B1 * | 10/2005 | Balnaves | ............. G11B 27/034 715/202 |
| 7,518,630 | B2 | 4/2009 | Gaylord | |
| 7,548,258 | B2 | 6/2009 | Kaplinsky | |
| 7,646,736 | B2 | 1/2010 | Yang et al. | |
| 7,852,948 | B2 | 12/2010 | Suzuki | |

| | | | | |
|---|---|---|---|---|
| 8,477,173 | B2 | 7/2013 | Kenoyer et al. | |
| 8,817,870 | B2 | 8/2014 | Zhang et al. | |
| 8,966,556 | B2 | 2/2015 | Sharp et al. | |
| 8,988,486 | B2 | 3/2015 | Golas | |
| 9,838,329 | B2 | 12/2017 | Sun et al. | |
| 10,257,246 | B2 | 4/2019 | Son et al. | |
| 10,545,850 | B1 * | 1/2020 | Iyer | ........................ G06F 11/302 |
| 10,567,765 | B2 | 2/2020 | Marlatt et al. | |
| 2007/0168946 | A1 * | 7/2007 | Drissi | ........................ G06F 8/36 717/110 |
| 2007/0263077 | A1 | 11/2007 | Dhuey et al. | |

(Continued)

FOREIGN PATENT DOCUMENTS

| | | | | |
|---|---|---|---|---|
| CN | 113778848 | | 12/2021 | |
| CN | 113778848 A | * | 12/2021 | ............. G06F 8/427 |

(Continued)

OTHER PUBLICATIONS

Nan, CN-113778848 (Translated verion in English) Test code generating method, device, computer system and medium, Jan. 29, 2021.*

(Continued)

*Primary Examiner* — Jae U Jeon

(74) *Attorney, Agent, or Firm* — SCHWEGMAN LUNDBERG & WOESSNER, P.A.

(57) ABSTRACT

At least one unit of a software application is identified. The at least one unit includes source code. The source code of the at least one unit is analyzed to determine a style of the source code. Metadata is extracted from the at least one unit based on the source code analysis. One or more features of the extracted metadata are classified. A template file is modified based on the extracted metadata and the classified features to create a modified template file.

17 Claims, 6 Drawing Sheets

(56) References Cited

U.S. PATENT DOCUMENTS

| | | | | |
|---|---|---|---|---|
| 2011/0082721 A1* | 4/2011 | Arni | .................. | G06Q 10/0639 |
| | | | | 709/206 |
| 2011/0239199 A1* | 9/2011 | Kim | .................. | G06F 9/44505 |
| | | | | 717/174 |
| 2012/0287088 A1* | 11/2012 | Queck | ................. | G06F 3/03545 |
| | | | | 345/179 |
| 2018/0091568 A1* | 3/2018 | Edgington, Jr. | . | H04N 21/41415 |
| 2021/0103514 A1 | 4/2021 | Das et al. | | |

FOREIGN PATENT DOCUMENTS

| | | | | |
|---|---|---|---|---|
| CN | 119731639 A | | 3/2025 |
| JP | 2003203000 A | * | 7/2003 |
| WO | WO-2024039986 A1 | | 2/2024 |

OTHER PUBLICATIONS

"International Application Serial No. PCT US2023 071916, International Search Report mailed Nov. 27, 2023", 4 pgs.

"International Application Serial No. PCT US2023 071916, Written Opinion mailed Nov. 27, 2023", 7 pgs.

"International Application Serial No. PCT/US2023/071916, International Preliminary Report on Patentability mailed Feb. 27, 2025", 9 pgs.

Zeunert, Matt, "Lazy JavaScript Parsing in V8", [Online]. Retrieved from the Internet: <URL: https://web.archive.org/web/20220706202932/https://www.mattzeunert.com/2017/01/30/lazy-javascript-parsing-in-v8.html>, (Archived on Jul. 6, 2022), 7 pgs.

* cited by examiner

104

210

UNIT TESTING SYSTEM

PROCESSORS

202 — CODE ANALYSIS MODULE

204 — METADATA EXTRACTION MODULE

206 — FEATURE CLASSIFICATION MODULE

208 — TEMPLATE MODIFICATION MODULE

```
import toJson from 'enzyme-to-json';
import * as useProfileStoreModule from './useProfileStore';
import * as useLensProductsModule from './useLensProducts';
import { canTagCurrentProfileLensesSelector } from 'profileMgr/scripts/brandProfiles/selectors';
import * as useBrandProfileLensDetailsModule from 'profileMgr/scripts/brandProfiles/lenses/containers/br
import { Router } from 'shared/scripts/common/types';
import * as useRouter from 'shared/scripts/common/hooks/useRouter';
import { mockUseSelector } from 'tests/helpers/useSelectorHelper';
import CenteredSpinner from 'shared/scripts/common/components/CenteredSpinner';
import { LensProductsSection } from './LensProductsSection';
import React from 'react';

describe('LensProductsSection', () => {
  let props: React.ComponentProps<typeof LensProductsSection>;

const router = {} as Router;
  const useRouterSpy = jest.spyOn(useRouter, 'default');
  const useBrandProfileLensDetailsSpy = jest.spyOn(useBrandProfileLensDetailsModule, 'default');
  const useLensProductsSpy = jest.spyOn(useLensProductsModule, 'default');
  const useProfileStoreSpy = jest.spyOn(useProfileStoreModule, 'default');

beforeEach(() => {
    jest.resetAllMocks();

useProfileStoreSpy.mockReturnValue({ FILL_IN_MOCK_DATA });
    useLensProductsSpy.mockReturnValue({ FILL_IN_MOCK_DATA });
    useBrandProfileLensDetailsSpy.mockReturnValue({ FILL_IN_MOCK_DATA });
    useRouterSpy.mockReturnValue(router);
    mockUseSelector(canTagCurrentProfileLensesSelector, false);

props = {
      profileId: 'profileId',
      lensId: 'lensId',
      withStats: false,
    };
  });

it('renders baseline', () => {
    const wrapper = shallow(<LensProductsSection {...props} />);

expect(toJson(wrapper)).toMatchSnapshot();
  });

it('renders spinner while loading', () => {
    // throw mock data for test case
    const wrapper = shallow(<LensProductsSection {...props} />);

expect(wrapper.find(CenteredSpinner)).toHaveLength(1);
  });
});
```

FIG. 3B

CONTEXTUAL TEST CODE GENERATION

BACKGROUND

With the increased use of digital images, affordability of portable computing devices, availability of increased capacity of digital storage media, and increased bandwidth and accessibility of network connections, digital images and video have become a part of daily life for an increasing number of people. Additionally, the expectation of device users is that the experience of using apps on portable computing devices will continue to become more sophisticated and media-rich.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 3B illustrates an image of an example modified template file.

DETAILED DESCRIPTION

Developers of software code tend to run out of time during development cycles and writing unit tests for a software code project is one of the last and arguably painful and repetitive step before checking in code to a final storage repository to update a software product. Also, as conventional ways to write unit tests? become outdated, it is difficult to share new ways to write unit tests? with other developers. Further, when developing code, software developers may copy and paste portions of code from a different unit or application. Copying and pasting code may lead to various issues. For example, the software developer may forget to update test descriptions or names or the software developer may forget to remove unnecessary code for a current unit being developed. Moreover, a software developer may have to determine the most recent or most relevant testing code conventions to follow. In some cases, the software developer or tester may forget how to mock a certain piece of code. Mocking code may include creating a fake representation of the dependencies. For example, when testing an application which uses an Application Programming Interface (API) from a server, the API server may be mocked out so the test becomes more of unit test than integration or end-to-end testing.

Embodiments described herein involve generating a specification file with code relevant to the current unit under test. The specification file can be used to improve productivity, increase code consistency, and/or encourage better test coverage. The ease of using the generated specification file will also motivate users to write tests which will improve the quality of a software project by reducing the chance that an error is introduced into a software project.

Figure 1:
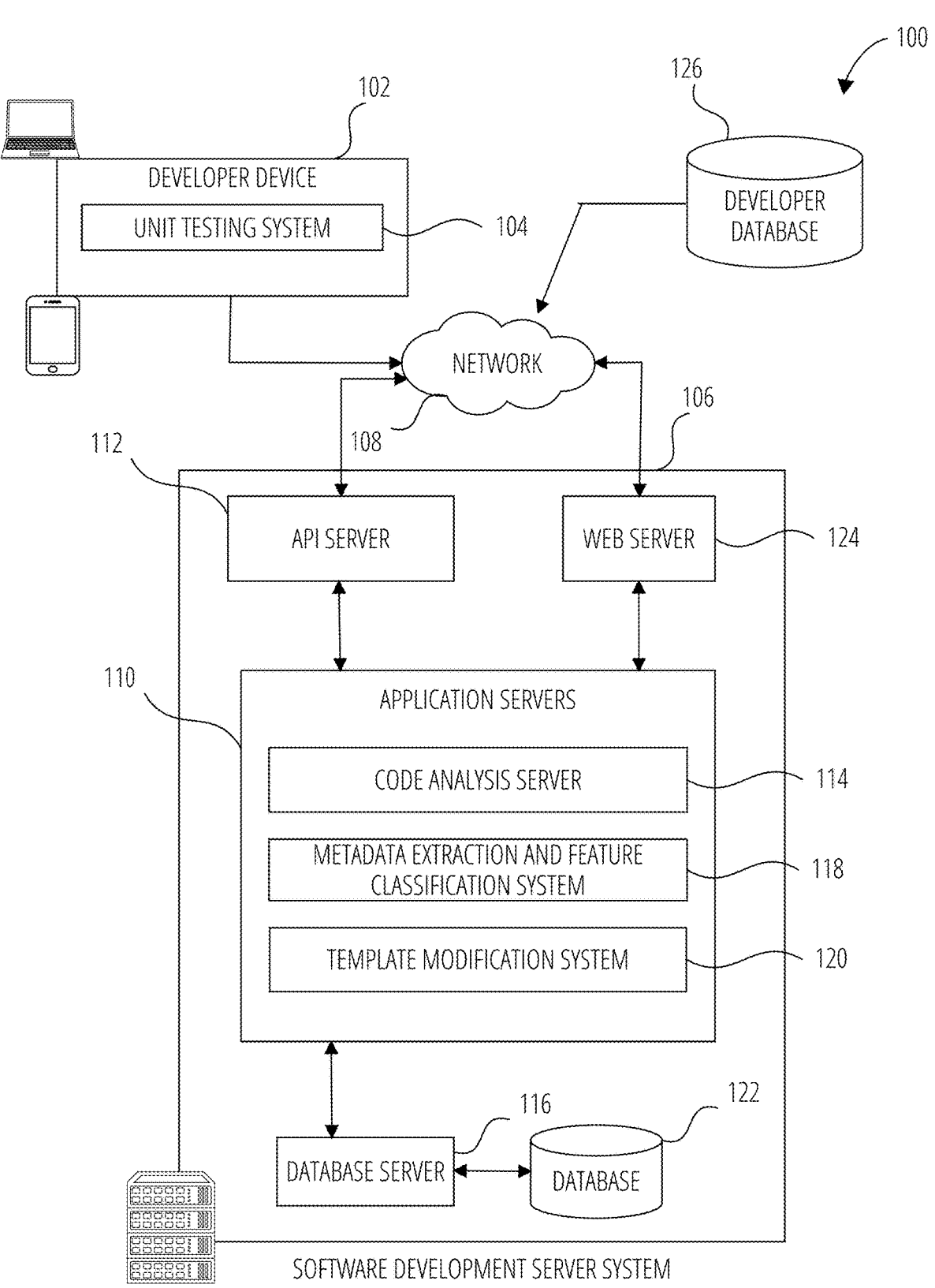
FIG. 1 is a diagrammatic representation of a networked environment in which the present disclosure may be deployed, in accordance with some examples.

FIG. 1 is a block diagram showing an example unit test development system 100 for exchanging data over a network. The unit test development system 100 includes at least one developer device 102 which hosts a number of software development applications, including a unit testing system 104. The developer device 102 is communicatively coupled to any other instances of the developer devices 102, a developer database 126 and a software development server system 106 via a network 108 (e.g., the Internet). A developer device 102 may also be able to utilize a locally-hosted unit testing systems 104 using one or more Application Program Interfaces (APIs).

The software development server system 106 provides server-side functionality via the network 108 to a particular developer device 102. While certain functions of the unit test development system 100 are described herein as being performed by either a developer device 102 or by the software development server system 106, the location of certain functionality either within the developer device 102 or the software development server system 106 is a design choice. For example, it may be technically preferable to initially deploy certain technology and functionality within the software development server system 106 but to later migrate this technology and functionality to the developer device 102 where a developer device 102 has sufficient processing capacity.

The software development server system 106 supports various services and operations that are provided to the developer device 102 Such operations include transmitting data to, receiving data from, and processing data generated by the developer device 102. This data may include code structure data, code syntax data, metadata, feature data, and test template data. Data exchanges within the unit test development system 100 are invoked and controlled through functions available via user interfaces (UIs) of the developer device 102.

Turning now specifically to the software development server system 106, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP), for example, and/or several other related protocols.

The Application Program Interface (API) server 112 receives and transmits data between the developer device 102 and the application servers 110. Specifically, the Application Program Interface (API) server 112 provides a set of interfaces (e.g., routines and protocols) that can be called or queried by the developer device 102 in order to invoke functionality of the application servers 110.

The application servers 110 host a number of server applications and subsystems, including, for example, a code analysis server 114, a metadata extraction and feature classification system 118, and a template modification system 120. The code analysis server 114 implements a number of source code processing technologies and functions. Moreover, processor and memory intensive processing of data may be performed server-side by the code analysis server 114, in view of the hardware requirements for such processing.

The metadata extraction and feature classification 118 is configured to perform extraction of metadata and/or features from source code, typically with respect to information sent from or received at the code analysis server 114. The template modification system 120 supports modification of a unit test template based on the code analysis by the code analysis server 114, the metadata extracted, and the features classified from the metadata extraction and feature classification 118 process.

Returning to the developer device 102, features and functions of an external resource (e.g., a unit testing system 104 or applet) may be made available to a user via an interface of the developer device 102. In this context, "external" refers to the fact that the unit testing system 104 or applet is external to the developer device 102. The external resource is often provided by a third party but may also be provided by the creator or provider of the developer device 102. The developer device 102 receives a user selection of an option to launch or access features of such an external resource. For example, the external resource may be accessed by the unit testing system 104 installed on the developer device 102 (e.g., a "native app"), or a small-scale version of the application (e.g., an "applet") that is hosted on the developer device 102 or remote of the developer device 102. The small-scale version of the application includes a subset of features and functions of the application (e.g., the full-scale, native version of the application) and is implemented using a markup-language document. In addition to using markup-language documents (e.g., a .*ml file), an applet may incorporate a scripting language (e.g., a .*js file or a .json file) and a style sheet (e.g., a .*ss file).

Figure 2:
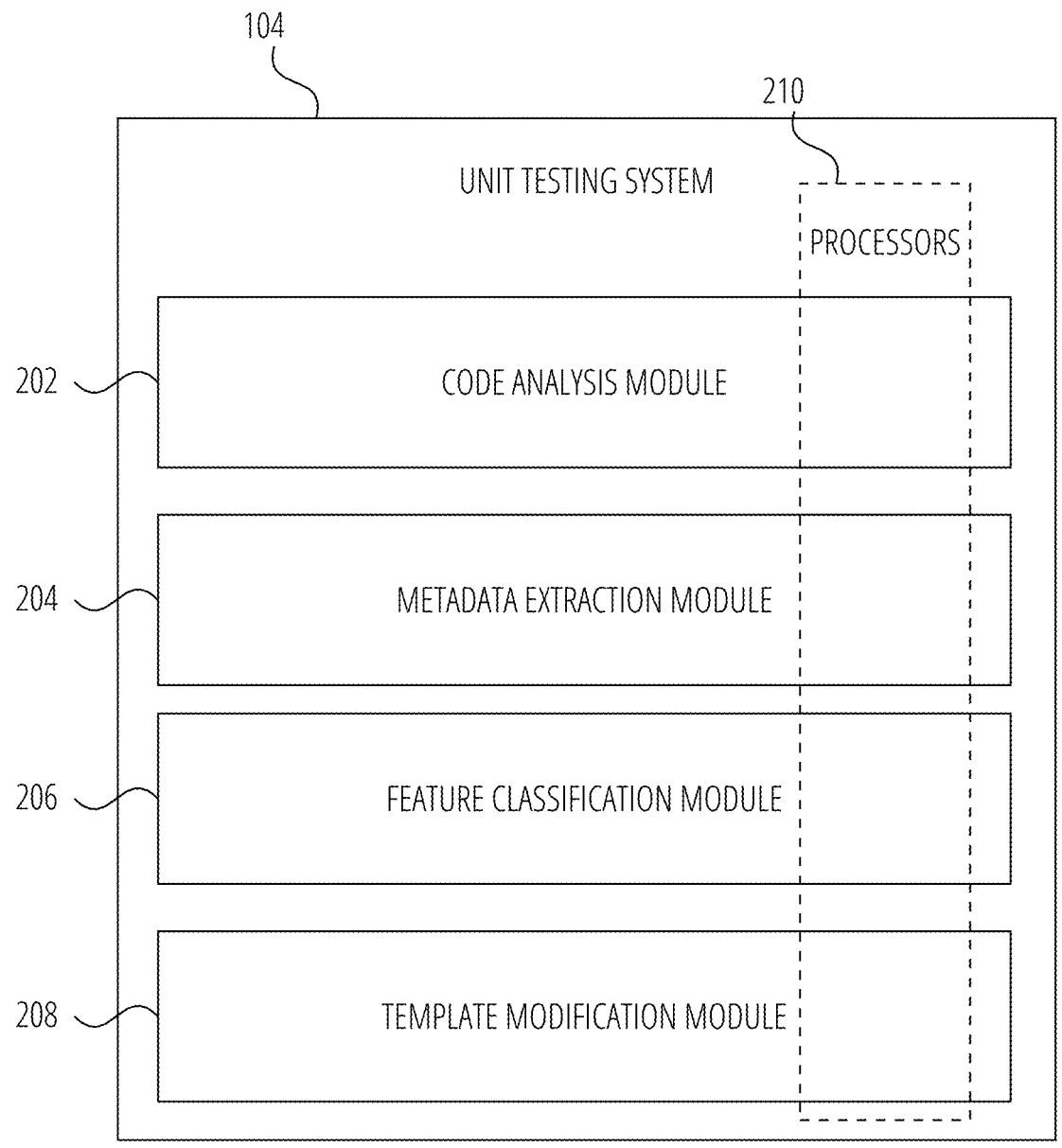
FIG. 2 is a block diagram illustrating various modules of the unit test development system.

FIG. 2 is a block diagram illustrating various modules of a unit testing system 104, according to certain example examples. The unit testing system 104 is shown as including a code analysis module 202, a metadata extraction module 204, a feature classification module 206, and a template modification module 208. The various modules of the unit testing system 104 are configured to communicate with each other (e.g., via a bus, shared memory, or a switch). Any one or more of these modules may be implemented using one or more computer processors 412 (e.g., a set of processors provided by the developer device 102).

Any one or more of the modules described may be implemented using hardware alone (e.g., one or more of the computer processors 404 of a machine (e.g., machine 400) or a combination of hardware and software. For example, any described module of the unit testing system 104 may physically include an arrangement of one or more of the computer processors 210 (e.g., a subset of or among the one or more computer processors of the machine (e.g., machine 400) configured to perform the operations described herein for that module. As another example, any module of the unit testing system 104 may include software, hardware, or both, that configure an arrangement of one or more computer processors 210 (e.g., among the one or more computer processors of the machine (e.g., machines 400) to perform the operations described herein for that module. Accordingly, different modules of the unit testing system 104 may include and configure different arrangements of such computer processors 210 or a single arrangement of such computer processors 210 at different points in time. Moreover, any two or more modules of the unit testing system 104 may be combined into a single module, and the functions described herein for a single module may be subdivided among multiple modules. Furthermore, according to various examples, modules described herein as being implemented within a single machine, database, or device may be distributed across multiple machines, databases, or devices.

In one example, the code analysis module 202 receives source code and analyzes particular information about the source code. For example, the code analysis module 202 determines a particular style of the received source code. This is accomplished by determining patterns of syntax within the source code. It is to be understood that one or both of the code analysis module 202 and the analysis server 114 may be configured to analyze the particular information about the source code. In some cases, the code analysis module 202 performs some of the code analysis functionality locally while the code analysis server 114 is configured to analyze other particular information. According to various configurations, the code analysis module 202 queries an abstract syntax tree (AST) to determine a style of the source code. In one example, a TypeScript AST is queried to determine patterns of syntax using a cascading style sheet (CSS) style selector system. The code analysis module 202 generates output comprising, for example, HTML style that is used by the metadata extraction module 202.

The metadata extraction module 204 is configured to extract pertinent metadata of the source code based on the output from the code analysis module 202. The metadata extracted may include information about a project that the source code is associated with, any imported code, component definitions, component features (e.g. the way a function is triggered internally inside the component code), component dependencies, and component properties. It is to be understood that one or both of the metadata extraction module 204 and the metadata extraction and feature classification system 118 may be configured to extract the pertinent metadata. In some cases, the metadata extraction module 204 performs some of the metadata extraction functionality locally while the metadata extraction and feature classification system 118 is configured to extract other pertinent metadata.

The feature classification module 206 uses the metadata extracted from the metadata extraction module 204 to classify features of the source code. For example, the feature classification module 206 uses component definitions and/or component properties to classify the source code to be aligned with various features. It is to be understood that one or both of the feature classification module 206 and the metadata extraction and feature classification system 118 may be configured to extract the pertinent metadata. In some cases, the metadata extraction module 204 performs some of the feature classification functionality locally while the metadata extraction and feature classification system 118 is configured to classify other features. Metadata is broken down into different categories (e.g. component definition and component dependencies) and classification code analyzes information from the appropriate categories and assigns classes for the source code. For example, based on the component definition, the system can identify and differentiate between a component, a hook, and/or a utility function.

The template modification module 208 uses the information collected from the code analysis module 202, the metadata extraction module 204, and the feature classification module 206 to update a template file to align with the current source code under test. It is to be understood that one or both of the template modification module 208 and the template modification system 120 may be configured to modify the template file. In some cases, the template modification module 208 performs some of the template modification functionality locally while the template modification system 120 is configured to modify other parts of the template.

In one example the template file is a static file and a separate instance of the template file is modified for the current code under test, using the information collected. In some cases, a modified version of the template file is stored to use for future unit tests. According to various configurations, JsCodeShift is used for rewriting TypeScript and/or JavaScript code in the static template file. For instance, the template file is a template for a specification file and/or for a unit test script.

The template file may include code for running one or more unit tests. The template file may be modified by adding information that is relevant to the current unit under test. For example, the template file may be updated by adding relevant component definitions and relevant classified features in a determined style of the source code. It is to be understood that the template file may be updated based on any pertinent information related to the source code. This pertinent information may vary between units and/or may be customizable by one or more users of the template.

According to various configurations, the template modification process is customizable. For example, a process is defined by a set of instructions that define what code to insert, a specific time to insert the code, and/or where to insert the code based on the extracted metadata and the feature classification process. According to various configurations, the template file may be configured to annotate the source code with comments and/or descriptions based on the functions contained in the source code. In some cases, the template may include generated code to perform test validations and/or test assertions.

Figure 3A:
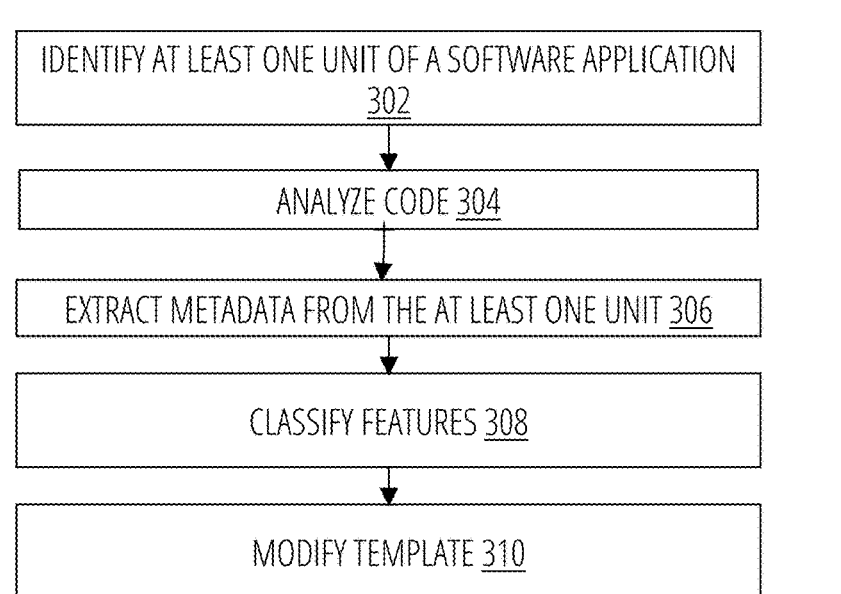
FIG. 3A illustrates a process for generating and modifying a template file to perform a unit test into source code.

FIG. 3A illustrates a process for generating and modifying a template file in accordance with embodiments described herein. In block 302, routine 300 identifies at least one unit of a software application. According to various embodiments, the at least one unit comprises source code.

In block 304, routine 300 analyzes the source code to determine a particular style of the source coded, as explained above. In block 306, routine 300 extracts metadata from the at least one unit based on the analyzed source code, as also described above. In one example, the metadata includes one or more imports of one or more software modules, component definitions, and features used by the at least one unit. According to various configurations, the imports described herein may include the modules which source code depends on and/or additional test helpers and/or utility modules to help with testing.

In block 308, routine 300 classifies one or more features of the extracted metadata. For example, classifying the features may include classifying one or more functions of the at least one unit based on the extracted metadata, as described above.

In block 310, routine 300 modifies a template file based on the extracted metadata and the classified features, as described above. One or more unit tests of the source code may be executed based on the modified template file.

According to various configurations, at least one syntax pattern is determined in the source code. In such cases, modifying the template file includes modifying the template file based on the at least one syntax pattern. For example, when analyzing a component, a component may be classified as a property-less component versus one having properties. Another example is analyzing the definition of a function to identify if it is a function component versus a general utility function.

The template file may be modified using customizable process based on the extracted metadata. For example, the customizable process includes modifying the source code at a predefined time period and/or at a predefined place within the template file. The predefined time period and/or the predefined place is customizable by a user (e.g., a software developer and/or tester). FIG. 3B is an image of an example modified template file.

Machine Architecture

Figure 4:
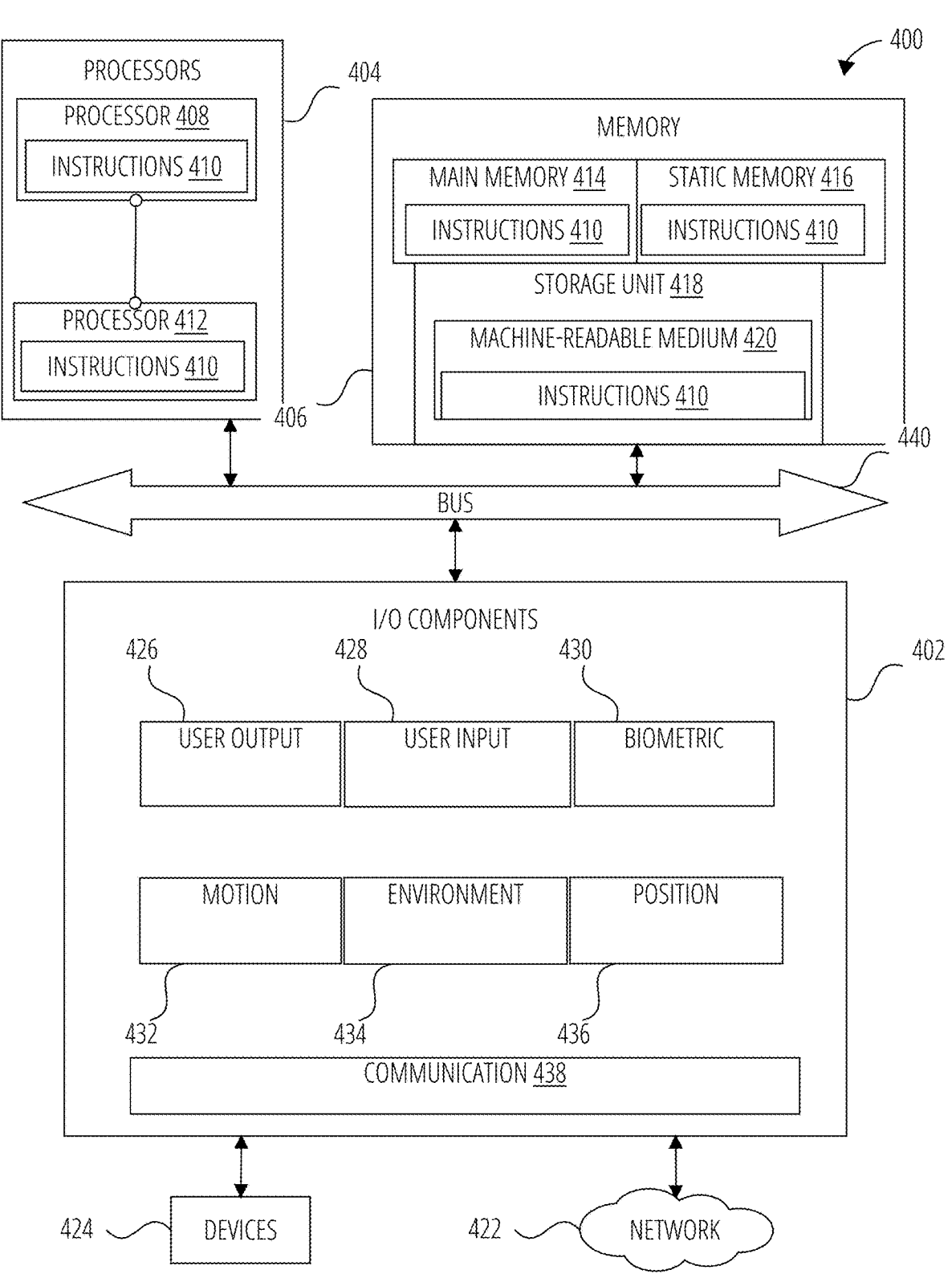
FIG. 4 is a diagrammatic representation of a machine in the form of a computer system within which a set of instructions may be executed for causing the machine to perform any one or more of the methodologies discussed herein, in accordance with some examples.

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the developer device 102 or any one of a number of server devices forming part of the software development server system 106. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 402, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the developer device 102 may have a camera system comprising, for example, front cameras on a front surface of the developer device 102 and rear cameras on a rear surface of the developer device 102. The front cameras may, for example, be used to capture still images and video of a user of the developer device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the developer device 102 may also include a 3600 camera for capturing 360° photographs and videos.

Further, the camera system of a developer device 102 may include dual rear cameras (e.g., a primary camera as well as a depth-sensing camera), or even triple, quad or penta rear camera configurations on the front and rear sides of the developer device 102. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
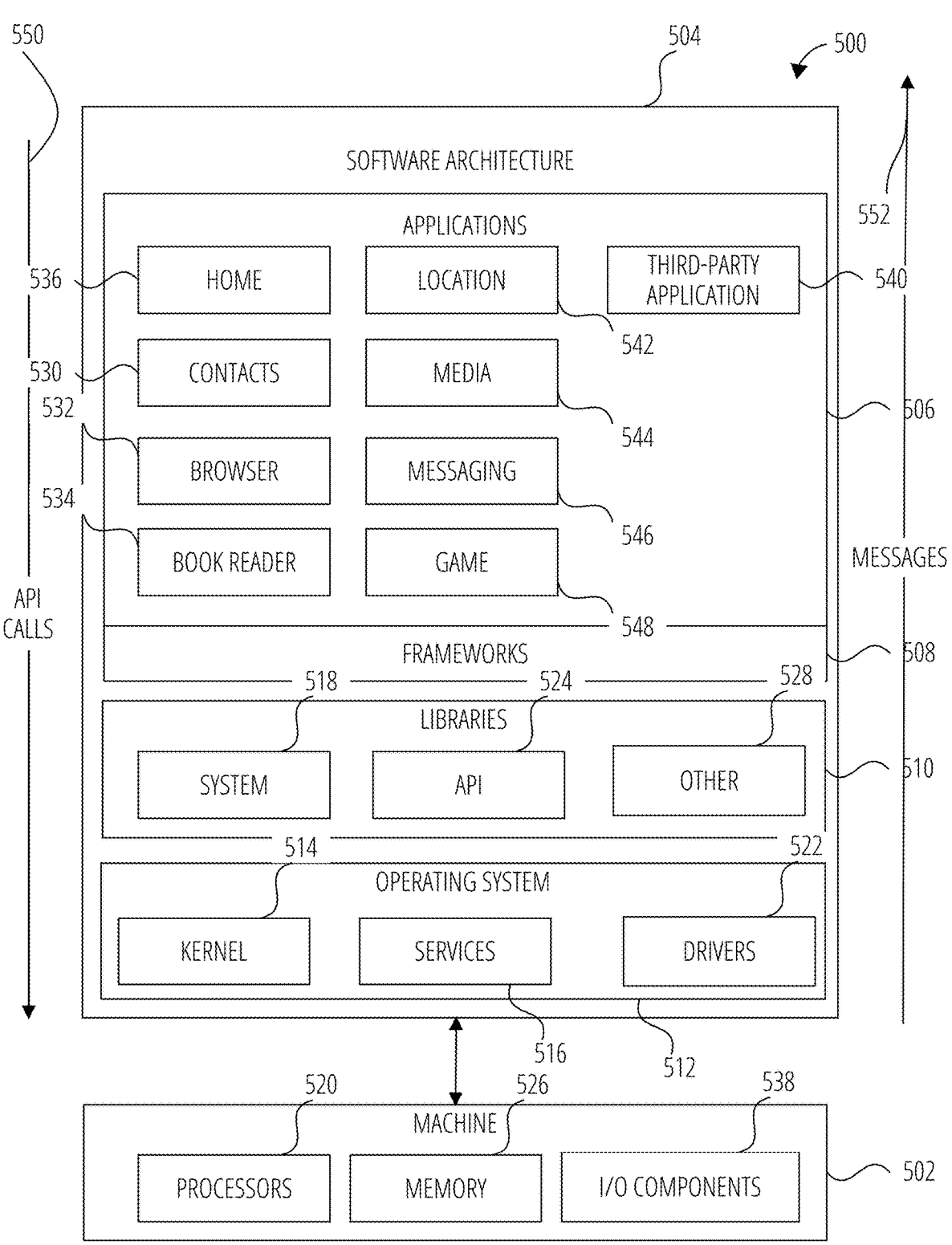
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLU-ETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed by a computing device, the method comprising:

executing one or more unit tests using the modified template file, wherein modifying the template file includes adding one or more component definitions and dependencies in the style identified from the source code analysis and modifying a template file based on classified features of extracted metadata that is from at least one unit of a software application, the at least one unit comprising source code as a result of source code analysis, the result of the source code analysis comprising: a style of the source code and whether a first component is a property-less component indicating a structural characteristic of the component lacking property data, the classified features of the extracted metadata including a fake dependency between the first component and a second component; and wherein executing the one or more unit tests further comprises generating the fake dependency for the software application that uses an Application Programming Interface (API).

2. The method of claim 1, wherein the metadata comprises one or more imports of one or more software modules, component definitions, and features used by the at least one unit.

3. The method of claim 1, further comprising determining at least one syntax pattern in the source code and wherein modifying the template file comprises modifying the template file based on the at least one syntax pattern.

4. The method of claim 1, wherein modifying the template file comprises modifying the template file using a customizable process based on the metadata.

5. The method of claim 1, wherein the modifying the template file comprises modifying the template file at a predefined place within the template file.

6. The method of claim 5, wherein the predefined place within the source code is customizable by a user.

7. The method of claim 1, wherein classifying one or more features of the extracted metadata comprises classifying one or more functions of the at least one unit based on the extracted metadata.

8. The method of claim 1, wherein the modifying the template file comprises modifying the template file at a predefined time for the template file.

9. The method of claim 8, wherein the predefined time is customizable by a user.

10. A computing apparatus, the computing apparatus comprising:

at least one processor; and a memory storing instructions that, when executed by the at least one processor, configure the apparatus to perform operations comprising:

executing one or more unit tests using the modified template file, wherein modifying the template file includes adding one or more component definitions and dependencies in the style identified from the source code analysis and modifying a template file based on classified features of extracted metadata that is from at least one unit of a software application, the at least one unit comprising source code as a result of source code analysis, the result of the source code analysis comprising: a style of the source code and whether a first component is a property-less component indicating a structural characteristic of the component lacking property data, the classified features of the extracted metadata including a fake dependency between the first component and a second component; and wherein executing the one or more unit tests further comprises generating the fake dependency for the software application that uses an Application Programming Interface (API).

11. The computing apparatus of claim 10, wherein the metadata comprises one or more of imports of one or more software modules, component definitions, and features used by the at least one unit.

12. The computing apparatus of claim 10, the operations further comprising determining at least one syntax pattern in the source code and wherein modifying the template file comprises modifying the template file based on the at least one syntax pattern.

13. The computing apparatus of claim 10, wherein modifying the template file comprises modifying the template file using a customizable process based on the extracted metadata.

14. The computing apparatus of claim 10, wherein modifying the template file comprises modifying the template file at one or more of a predefined time and a predefined place within the template file.

15. The computing apparatus of claim 14, wherein one or both of the predefined time and the predefined place within the source code is customizable by a user.

16. The computing apparatus of claim 10, wherein classifying one or more features of the extracted metadata comprises classifying one or more functions of the at least one unit based on the extracted metadata.

17. A non-transitory computer-readable storage medium including instructions that, when processed by a computer, configure the computer to perform operations comprising:

executing one or more unit tests using the modified template file, wherein modifying the template file includes adding one or more component definitions and dependencies in the style identified from the source code analysis and modifying a template file based on classified features of extracted metadata that is from at least one unit of a software application, the at least one unit comprising source code as a result of source code analysis, the result of the source code analysis comprising: a style of the source code and whether a first component is a property-less component indicating a structural characteristic of the component lacking property data, the classified features of the extracted metadata including a fake dependency between the first component and a second component; and wherein executing the one or more unit tests further comprises generating the fake dependency for the software application that uses an Application Programming Interface (API).

* * * * *